United States Patent [19]

Berrebi

[11] Patent Number: 4,551,437

[45] Date of Patent: Nov. 5, 1985

[54] PROCESS FOR THE TRANSPORTATION THROUGH AN ELONGATE CHAMBER AND ELECTROMAGNETIC RADIATION HEATING OF GRANULATED MATERIAL

[75] Inventor: Georges Berrebi, Valence, France

[73] Assignee: Eurecat-Europeene de Retraitement de Catalyseurs, La Voulte sur Phone, France

[21] Appl. No.: 567,722

[22] Filed: Jan. 3, 1984

[30] Foreign Application Priority Data

Mar. 15, 1983 [FR] France ................. 83 04350

[51] Int. Cl.$^4$ .................. B01J 23/96; B01J 23/94; B01J 23/92; F27B 9/06
[52] U.S. Cl. ............................... 502/5; 34/4; 34/164; 219/388; 432/134; 502/34; 502/48; 502/514; 502/517; 502/522
[58] Field of Search ............... 502/5, 45–48, 502/20, 34, 38, 56, 517, 514, 522; 204/157.1 R

[56] References Cited

U.S. PATENT DOCUMENTS

| | | | |
|---|---|---|---|
| 3,173,768 | 3/1965 | Witte | 34/164 |
| 3,545,098 | 12/1970 | Eicholtz et al. | 34/164 |
| 3,915,890 | 10/1975 | Soldate | 502/56 |
| 4,026,821 | 5/1977 | Schoofs et al. | 502/517 |
| 4,399,350 | 8/1983 | Schneider et al. | 34/164 |

Primary Examiner—P. E. Konopka
Attorney, Agent, or Firm—Millen & White

[57] ABSTRACT

A process and apparatus for the transportation and heating of granulated materials, particularly of solid particles of catalyst used for hydrocarbon conversion which must be activated or regenerated. The process comprises moving a bed of catalyst particles on travelling bands or floor plates passing through an elongate chamber and eventually inclined to the axis. The bands are subjected to vibrations imparting to said bed an unidirectional motion, and said bed on said bands being exposed to heating by means of electromagnetic radiations of a wave length range from 0.38 μm to 50 mm.

8 Claims, 6 Drawing Figures

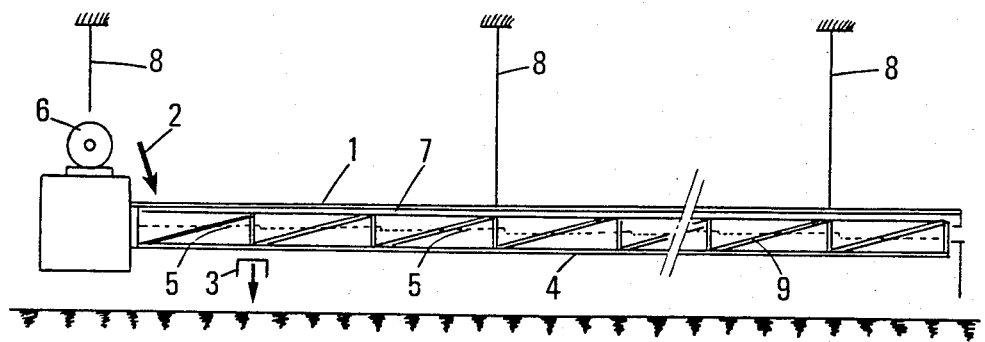
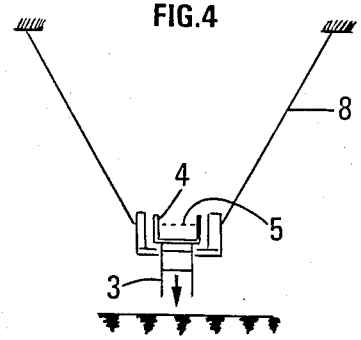

PROCESS FOR THE TRANSPORTATION THROUGH AN ELONGATE CHAMBER AND ELECTROMAGNETIC RADIATION HEATING OF GRANULATED MATERIAL

BACKGROUND OF THE INVENTION

The invention concerns a process and an apparatus for activating, reactivating or regenerating a solid catalyst for the treatment or conversion of hydrocarbons.

The catalyst treated according to the invention is used as solid particles, these particles being of various shapes such as balls, crushed materials, extrudates, pellets, etc.

The activable, reactivable or regenerable catalysts according to the invention are particularly the catalysts for the treatment, hydrotreatment, visbreaking and conversion or hydroconversion of hydrocarbons and/or hydrocarbon cuts of various origins; examples of hydrocarbon cuts are liquid charges obtained from distillates of heavy crude oils, residues from the straight-run or vacuum distillation of hydrocarbons obtained from effluents of coal liquefaction etc. Mention will also be made of liquid charges of oil origin or of a different origin, to be subjected to any one of the treatments selected for example from dehydration, hydrosulfurization, hydrodenitrogenation, desulfurization, hydrodesulfurization, dehydrohalogenation, reforming, reactions for producing aromatic hydrocarbons, steam reforming, cracking, hydrocracking, hydrogenation, dehydrogenation, isomerization, dismutation, oxychlorination, dehydrocyclization of hydrocarbons or other organic compounds, oxidation and/or reduction reactions, Claus reaction, treatment of the exhaust gases from internal combustion engines, demetallation, etc.

During each catalytic treatments, a rather quick deactivation of the catalyst is observed as a result of the presence of catalyst poisons, coke formation, deposit of certain metals, etc. This deactivation requires a frequent replacement of the whole or a part of the catalytic bed.

The catalyst contains, as basic material, at least one oxide of a metal (e.g. aluminum) or metalloid (e.g. silicium). Actually, the catalyst is constituted of (a) a carrier (or matrix) whose basic material is said oxide and (b) an active phase containing at least one metal, optionally with metal precursors or promoters. Examples of carriers are all kinds of aluminas, either silicas, either silicas-aluminas, all these various oxides being used in amorphous state or in crystallized state (zeolites) or still as a mixture of amorphous and crystallized oxides. Further examples of oxides which can be used as carriers, either alone or in admixture, are magnesias, bauxites, clays, kieselguhrs, silicas-magnesias, aluminas-magnesias, boron-aluminas, etc.

Practically all the metals of the periodic classification of elements can be used as active phase of the catalyst and, particularly, either alone or in admixture, iron, cobalt, nickel, tungsten, molybdenum, copper, silver, gold, the noble metals of the platinum family, germanium, tin, lead, indium, thallium, titanium, rhenium, manganese, chromium, vanadium, etc. These metals are used, for example, either directly as metals or as oxides or sulfides (particularly cobalt, molybdenum, tungsten, nickel and iron oxides and sulfides).

The activation or reactivation or regeneration of the catalysts generally requires at least one step of heating the catalyst to remove from each catalyst grain or particle at least one type of impurities. Thus, for example, the catalysts which have been used in reactions of desulfurization or hydrodesulfurization of hydrocarbons contain substantial amounts of sulfur and carbon, elements which have to be removed before the re-use of the catalyst.

SUMMARY OF THE INVENTION

According to the invention, the catalyst particles are caused to move inside at least one rectilinear elongate zone (optionally inclined, its longitudinal axis forming an angle to a horizontal line smaller than ±5°, generally smaller than ±3°) and provided with at least one wall or floor plate (which may have an inclination smaller than ±15°, preferably smaller than ±10° with respect to the longitudinal axis of the elongate zone) which holds the catalyst particles (and thus forms a floor-plate therefor). The motion of the catalyst particles, from an inlet zone of the elongate zone to an outlet zone of the elongate zone, is obtained by means of vibrations, generated by a vibratory power, which induce the horizontal displacement of each catalyst particle over said wall supporting it, the heating of said catalyst particles being achieved by means of at least one electro-magnetic waves emitting plate located above said wall supporting said catalyst particles over at least one part of said wall.

The process according to the invention for activating, reactivating or regenerating solid catalyst particles thus consists of:

(a) circulating, preferably continuously, said particles from an inlet zone to an outlet zone of at least one elongate chamber whose longitudinal axis is inclined at an angle smaller than ±5° to a horizontal line, said particles being supported by at least one wall whereon they move and whose inclination angle with respect to said longitudinal axis is comprised between 0 and ±15°, the motion of said catalyst particles being obtained as the result of the vibrations of said elongate chamber at such an amplitude that a translational movement is imparted to the catalyst particles over the length of said chamber, with a substantially uniform statistical distribution over the section of said chamber, a differential speed providing for the continuous circulation of the particles, (b) heating said catalyst particles by convection and/or radiation, by means of identical or different electromagnetic waves, the one or more wave lengths used comprising generally between about 0.38 μm and about 50 mm, thus covering the range of the visible light (0.38 to 0.76 μm), the infra-reds (0.75 μm to 1 mm) and a portion of the microwaves range (1 to 50 mm).

In a preferred manner, there is used one or more wave lengths comprised between 0.5 μm and 15 mm. The more particularly convenient radiations are those of infra-red or near to infra-red (e.g. 0.75 μm to 1.5 mm).

In accordance with the invention, the radiation and/or convection is obtained by means of at least one plate, or box, emitting radiations, said plate being placed substantially horizontally in said elongate chamber, above the path of the catalyst particles bed.

The use of a series of adjacent walls, having optionally a slight inclination, smaller than 15° above or below the longitudinal axis of the elongate chamber (i.e. ±15° with respect to said axis) and generally of about 1° to 10°, makes possible for each catalyst particle at each end of the wall to fall onto the end of the next wall. During this fall, the particle generally turns over, completely or not, and thus exposes to the electromagnetic radiation another part of its geometrical surface, so that at the outlet of said activation, reactivation or regeneration chamber all the geometrical surfaces of the catalyst particle have been subjected to the electromagnetic radiation.

In the specification of the present patent application, the word "wall" has been arbitrarily used to define the one or more floorplates (or bands) which support the bed of moving catalyst particles.

Generally the one or more floors or walls which support the catalyst particles are substantially and regularly discontinuous (e.g. a grid), i.e. are provided with at least several regularly spaced openings whose size is sufficiently small to prevent the catalyst particles from passing through said floors or walls but sufficiently large to give passage to gas through said walls, as will be explained hereinafter.

BRIEF DISCUSSION OF THE DRAWINGS

FIG. 1 schematically illustrates a revolving furnace of the type to which the use of the process of the invention is directed;

FIG. 2 shows a cross-sectional view of the apparatus of FIG. 1;

FIG. 3 schematically illustrates an embodiment of the invention illustrating the elongate chamber, means for heating the particles as well as other means for conveying the particles through the device;

FIG. 4 is a cross-sectional view of the device of FIG. 3; and

DETAILED DISCUSSION OF THE INVENTION

Figure 1:
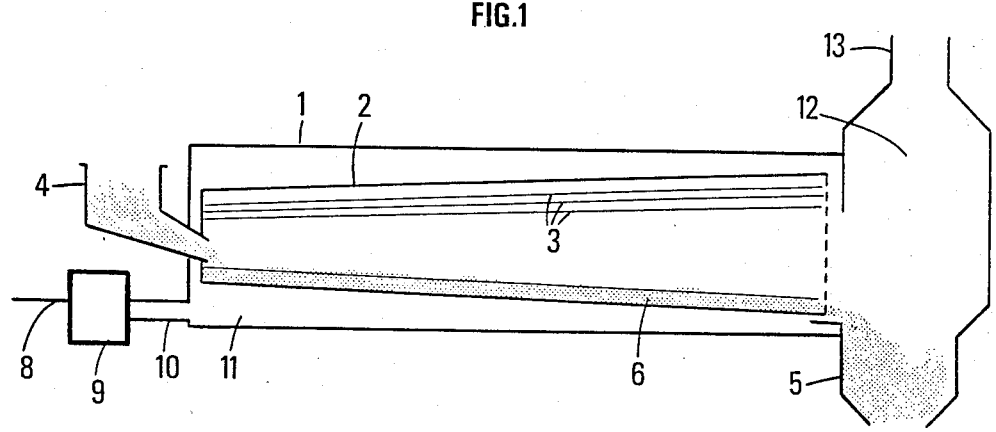

The apparatus according to the invention comprises more particularly (see FIG. 3 by way of example):
- at least one elongate chamber (1) substantially horizontal (angle to a horizontal line: 0 to ±5°)
- means (2) for introducing solid particles at one end of the chamber,
- means for withdrawing solid particles at the other end of the chamber,
- a trough (4) provided over the whole length of the elongate chamber, said through supporting at least two floors or walls and preferably a plurality of floors or walls (5) in discontinuous arrangement (each floor being generally a grid or any other convenient device) and adjacent and preferably all in gentle slope, the upper level of each floor or wall being located towards the end of the chamber wherethrough are withdrawn the solid particles, the inclination angle of each floor or wall, with respect to the longitudinal axis of the chamber being lower than 15° (the direction of the slope down being in some cases in a direction opposite to that of the particles motion) said walls being used as bands for supporting the catalyst particles introduced into said chamber,
- means (6) for generating vibratory power and inducing vibrations of the trough which generate vibratitons of said walls as necessary to obtain the displacement of the catalyst particles on said walls from the inlet of the particles in said chamber to their outlet,
- means for heating the catalyst particles, this means consisting of at least one plate shaped as a box (7), i.e. as a parallelepiped or any other convenient shape, said plate being placed above said walls and emitting a wave or a wave spectrum having the object to heat said particles circulating on said walls.

For generating the vibrations of the chamber, there is generally used a motor, electric or not. The motor and the chamber are generally supported by flexible suspensions (8) (shown in FIG. 3); the angular speed generated by at least one imbalance output shaft of the motor may cause the chamber to vibrate, hence the trough, and, consequently the one or more walls on which are placed the moving catalyst particles.

A transporter acting by inertia, according to the invention, consists of a trough, having in most cases a rectangular cross-section, at the end of which is mounted an inertia exciter transmitting a back-and-forth motion substantially parallel to each wall. The catalyst particles on each wall thus remain in contact with the wall when the latter moves forward and slide thereon when it moves backwards. This explanation is schematic, the effective behavior of the catalyst particles being more complex. However, the result is that the product moves forward without microprojection on the wall, by sliding. A number of advantages are inherent to this system:
- no dynamic reactions on the ground,
- low excitation frequencies-high mechanical strength
- smoothness of operation, low noise,
- gentle handling of the product (no shock or microvibrations).

Generally, in the prior art, the activation, reactivation and regeneration of the catayst require two steps. Thus, by way of example, a catalyst exhausted in a hydrotreatment and/or hydrodesulfurization operation contains high proportions of sulfur and carbon. In this case, the regeneration of the catalyst is achieved thermally in two steps, the first one being for example effected between about 180° and 350° C. and preferably towards about 200° to 250° C., with the object of removing at least a portion of the sulfur and the second step being effected between about 400° and 600° C. and, for example, at about 480° C., with the object of removing at least a portion of the carbon (decoking). During these operations, it is necessary to supply air, on the one hand, for the combustion and, on the other hand, for controlling the heat removal. These operations are conducted in two steps, in muffle furnaces at the laboratory or in furnaces of large capacity at industrial scale. The first and the second steps may be effected either in two separate furnaces or in the same furnace, where the two steps are thus successively effected. The industrial use of two separate furnaces is costly in view of the large size of such furnaces. The use of a single furnace is not sufficiently flexible in view of the substantial time losses at least for waiting the temperature raise necessary to pass from the first step to the second step or the temperature decrease to operate subsequently a first step for the treatment of other catalyst batches.

According to this invention, it is possible either to make use of the same furnace to successively effect each of the two steps (the delays for waiting the temperature adjustment are shorter than in the prior art), or to make use of two furnaces in series in conformity with the invention; or still to make use of a furnace according to the prior art for the first step in series with a furnace according to the invention for the second step. A preferred process consists of making use, in combination with the furnace according to the invention, of a particular revolving furnace whereof one of a practical aspect is illustrated in FIG. 1 (longitudinal cut) and FIG.f 2 (cross-section of the apparatus). It may comprise, for example, an elongate chamber substantially cylindrical and horizontal which constitutes the wall of the activation or reactivation or regeneration enclosure. The treatment of the catalyst is effected inside chamber (1) in a zone or shell (2), preferably of frustroconical or pyramidal shape (the average angle between the axis of the cone or of the pyramid and one of the cone generatrices or the pyramid edges is lower than 10°, and preferably between 1° and 5°). The chamber (1) slowly revolves on its axis. The catalyst is introduced, generally continuously, through line (4) and is withdrawn, also continuously, through line (5). The bed of catalyst particles is shown with reference (6).

Figure 2:
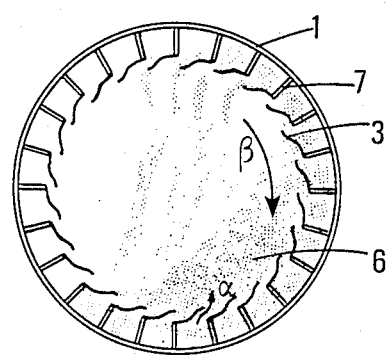

Ventilation ports or slots or apertures (3) are arranged, regularly or not, along said chamber from one end to the other end of zone (1). FIG. 2 shows a preferred type of slots (3) secured through legs (7) to the walls of chamber (1). Air, or an oxygen-containing gas is introduced through line (8), is conveyed to a heating zone (9) at the temperature necessary for the catalyst treatment and is introduced through line (10) into space (11) where, through the slots (3) it communicates (arrows referred to as ($\alpha$) in FIG. 2) with the catalyst. The slow rotation of the furnace, indicated by arrow ($\beta$) of FIG. 2, provides for the mixing by stirring of the solid and the gases. The gases are discharged from zone 12 through orifice 13.

The rotation of the furnace is effected at a speed generally comprised between 0.2 and 7.5 turns per minute, and preferably between 0.4 and 0.8 turns per minute.

This apparatus, of the so-called revolving type generally used in the prior art above 300° C., may give substantial results when used, for example, first at 170°–350° C. or 250°–300° C. or also 170°–245° C. or 180°–290° C. for the stripping of residual hydrocarbons absorbed by the catalyst mass and for removing the major part of the sulfur retained by the catalyst in the reactions of catalyst hydrotreatment and desulfurization and, subsequently at about 500° C. for removing carbonaceous deposits from the catalyst. But the combination of this type of revolving furnace used for effecting the first step with the type of furnace according to the invention for effecting the second step makes it possible to obtain particularly favorable results in activation, reactivation and/or regeneration of catalysts.

FIG. 3 as above described illustrates an embodiment of the invention (with cascades of walls or bands). It shows, in addition to the above-mentioned listed elements, an air outlet (3), elements (8) for supporting the furance and the frame-work (9) of the chamber.

FIG. 4 is a cross-sectional view of the apparatus and shows more particularly the arrangement of the trough (4) and of the supports (8) of the furnace.

Figure 5:
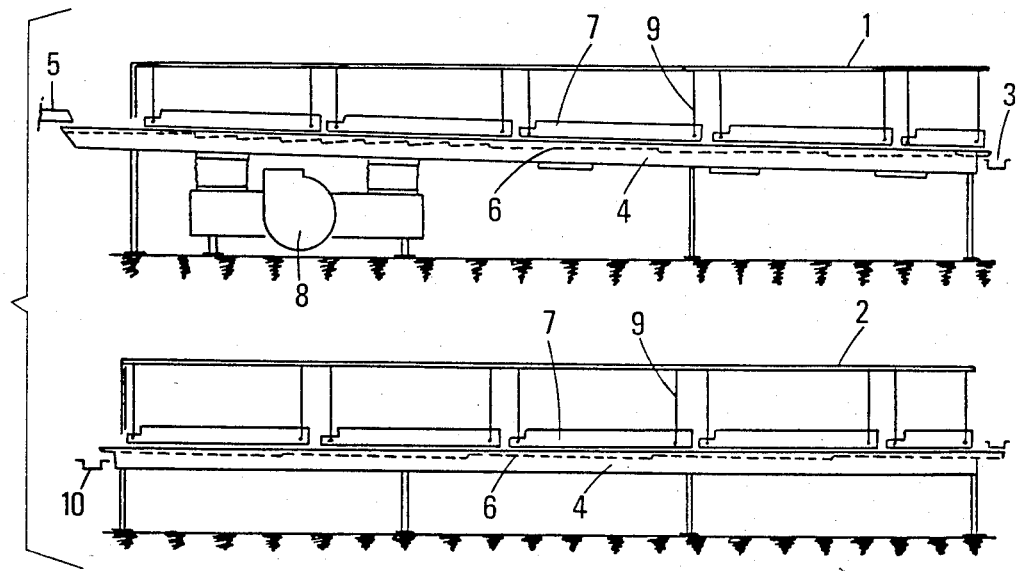
FIGS. 5 and 5A show side and aerial views of the furnace arrangement in two parts.
Figure 5A:
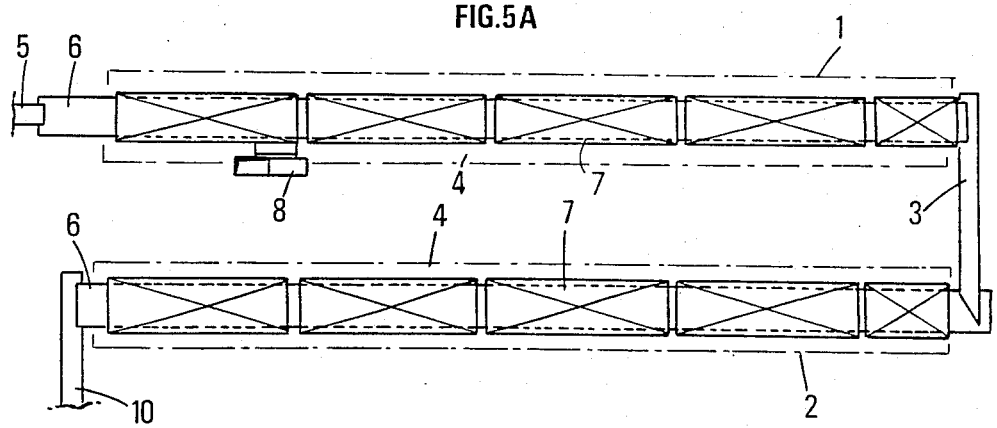

FIG. 5 and the aerial view of FIG. 5A illustrate a furnace arrangement in two parts, placed substantially side by side, the catalyst, after treatment, coming back substantially to the vicinity of its starting point before treatment; this has the advantage of saving other transportation means of any kind, to bring the catalyst particles back to their starting point. Thus, in FIGS. 5 and 5A, the catalyst circulates in the first part (1) of the furnace from left to right and then, in the second part (2) of the furnace, from right to left. The passage of the catalyst particles frowm one part to the other of the furnace is effected by any adequate means, for example by means of a travelling band (3) (see FIG. 5A). FIGS. 5 and 5A show the trough (4), an admission device (5) for the catalyst particles which progress on walls (6) below the heating boxes (7) maintained by means referred to as (9). The walls (6) of about identical lengths (or of increasing lenghts on the Figure), and eventually slightly inclined (walls or bands thus arranged in cascade), vibrate by the effect of the motor which has not been shown on these FIGS. 5 and 5A. At the end of the catalyst treatment, the latter is discharged through line (10). A ventilator (8) generates a stream of air (or of any other gas) passing through the catalyst bed laid on the walls in cascade (6). This air (or this gas) supplies the oxygen required for the oxidation reactions and removes the heat generated by these reactions, if any.

For a practical construction of the furnace according to the invention, it will be further stated that the layer of catalyst particles, circulating on the walls (or bands) located in the trough, has a thickness from 0.5 to 80 mm and preferably from 1.2 to 35 mm with a period of exposure to the heating devices ranging from 1 to about 50 minutes. The flow rate of the catalyst particles is advantageously from 100 to 2000 kg/hour. Thus, by way of example, it is possible with a plant having an installed capacity of about 800 KW, to treat a 20 mm layer of catalyst at a flow rate of 1000 kg/h, with an exposure time of each particle of about 15 minutes or even less. The rate of circulation of the catalyst particles is generally from 100 to 2000 kg/hour.

An advantage of the process and of the apparatus according to the invention is the following: in the prior art, it is necessary to supply and heat air to achieve the regeneration of the catalyst by thermal way or convection and/or conduction (which results generally in a high consumption of propane, which is the fuel used for this type of heating). Then, it is further necessary to use air again for controlling the heat removal. According to the present invention, the heat required for example, to burn the carbon, is supplied from an electromagnetic source: this system has the advantage of not heating the ambient air but of concentrating the heat directly onto the catalyst particles (the heat transfer is then no longer achieved by radiation but by mere convection or conduction and the temperature in the chamber may be relatively low whereas the particles grains are, on the contrary, at the required temperature for their treatment. By increasing the electromagnetic power, they could easily be brought to a temperature as high as 1000° C. or more).

The material used for heating the catalyst consists for example of boxes of a parallelepiped shape whose power, by way of example, may be from about 20 to 150 KW per $m^2$ of active radiating surface and preferably from 50 to 100 KW, these boxes being placed above the bands (walls) for the catalyst circulation and covering these bands, tightly if necessary; it is however not necessary that these boxes be adjacent to one another and free spaces may be left between the boxes, for instance to give clear way for various control means; this is particularly the case in FIGS. 5 and 5A where the catalyst particles are not covered by the heating means when passing from one part of the furnace to the other. These bands may either have a solid bottom or may preferably be of the wire ganze type or of the grid type (with a rectangular or square or round mesh etc. for example of about 0.2 mm of width or diameter), in order to provide for the air circulation through the band. Thus, by way of example, a ventilator assembly may be provided above the heating ramp (flow rate of about 40 m3/h/KW under a 2 mm water column for example), an assembly of extracting ventilators (of low output), (8) of FIGS. 5 and 5A, providing for the conveyance of air or of any other gas, through the catalyst layer, the flow rate, through registers, varying from 1000 to 25 000 Nm$^3$/h, for example and preferably from 4000 to 12 000 Nm$^3$/h for the whole ventilator assembly with the above indicated catalyst flow rates. The height of the catalyst particles layer thus depends simultaneously on the time of exposure to the electromagnetic radiation and on the extent of the ventilation or stirring with air of with another gas. The distance from the radiation emitting lamps to the lower part of the catalyst particles layer is comprised for instance, between 40 and 400 mm, and preferably between 100 and 140 mm.

Other advantages are provided by the process and the apparatus according to the invention: with this type of furnace, it is for example possible to calm down the speed and/or stirring of the catalyst grains or particles by convenient adjustment of the motor which imparts the transmission speed to the trough. Such a regulation is impossible either with a conventional furnace or with the above-described revolving furnace.

In the prior art, for example in the case where the above-described revolving furnace is used (for the regeneration of a desulfurization catalyst), at the end of first step, effected for example at about 300° C., the catalyst must be withdrawn from the furnace, generally stored in barrels and fed back to the furnace inlet to effect the second step towards 500° C. This results in substantial time losses and a quick wear of certain parts of the furnace subjected to different temperatures at each regeneration step, hence in frequent repairs (some fractures resulting from shrinkages may reach 10 cm) so that the use of the apparatus must be discontinued.

The apparatus used according to the invention, for example, to effect the second regeneration step (the first step being effected for example in a revolving furnace between, for example, 170° and 350° C. or between 250° and 300° C. or also particularly 170°–245° C., or preferably between 180° and 290° C., gives more flexibility to the regeneration: the catalyst withdrawn from the revolving furnace (or from any other type of furnace) may be fed to the furnace according to the invention without previous cooling and without transportation. It suffices to place the inlet of the furnace according to the invention in the vicinity of the outlet of the first furnace. In this manner, in such a system of serially connected furnaces, the thermal inertia is clearly improved. In addition, in the furnace according to the invention, the residence time on each catalyst particle is very short, of the order of 1 to 50 minutes, preferably from 2 to 25 minutes, instead of 2 to 10 hours in the conventional furnaces or in the so-called revolving furnace. The use of a furnace according to the invention, in association with, for example, a revolving furnace provides at the minimum for a double regeneration capacity, since the so-called revolving furnace is no longer used to effect the second step of the regeneration process, and, accordingly, is free again for the treatment of a new batch of spent catalyst; and this rotating furnace will thus be maintained always at the same temperature and will be no longer subjected either to the high temperature used in the second step or to the expansions-contractions which are liable to shorten its life-time. As a matter of fact, the residence time in the furnace according to the invention being very short, said furnace may optionally be used for other industrial applications during the period of the first regeneration step when it has been chosen to perform the latter in a conventional reactor. Another additional advantage of the furnace according to the invention concerns the cleanness. This type of apparatus becomes less dirty than the conventional furnaces and this is the more true as it works at substantially lower temperatures. In addition, the different parts of the apparatus are of easy access. Another advantage is the flexibility of use of such an apparatus: for example, it may consist of a large travelling band (with optional cascades, i.e. a succession of inclined or not floors as above explained) about twenty meters long and it is possible to operate only one half or one third or one quarter of the band and, for example, to make use of the whole or a part of the unused band portion for other catalyst treatments, at temperatures which are not necessarily those used in the other parts of the band already in operation.

EXAMPLE

The purpose is to regenerate a catalyst used for hydrodesulfurizing an oil. This catalyst contains 6% by weight of sulfur and 12% by weight of carbon. The specific surface of the fresh catalyst is 220 m$^2$/g.

The basic material of the fresh catalyst is a carrier of transition alumina of $\gamma$ type having a specific surface of 245 m$^2$/g and containing 14% by weight of molybdenum oxide MoO$_3$ and 3% of nickel oxide NiO.

Four regeneration methods will be used successively:

TEST 1

In this first test, not conforming with the invention, the catalyst is regenerated in a laboratory apparatus, more precisely in a muffle furnace, in two steps, the first one at 300° C. with a residence time of 4 hours, in order to remove the major part of the sulfur and the second step at 500° C. with a residence time of also 4 hours.

The results are indicated in Table I.

TEST 2

In this second test, also not conforming with the invention, there is used an industrial furnace of the type shown in FIGS. 1 and 2. In this furnace are effected two passages of the catalyst, the first passage being effected at 230° C. with residence time of 4 hours, the second passage being effected at 470° C. with also a residence time of 4 hours. The results are indicated in Table I. 1,000 kg of catalyst have been treated by hour. These results are only representative of the catalyst regeneration rate but it must be observed, in addition, that during said regeneration the same furnace is used to effect the two catalyst passages. Until all the catalyst is discharged from the furnace, after the first treatment at 230° C., it has been necessary to store the catalyst and, accordingly, the latter has become cold and has lost all the energy previously accumulated therein: at the end of the first passage at an average temperature of 230° C., its temperature is about 20° C. when it must be retreated for the second passage. Moreover, the furnace has been subjected to a non negligible strain during its work at temperatures of about 500° C. (expansion, wear of the rollers and of internal parts). Attention must also be paid to the very large volumes of air used with this type of furnace: the two temperature levels (230° C. and 470° C.) are reached by combustion of propane in a combustion chamber: for each of the two steps, for treating industrial amounts of catalyst, there is generally used 10 t/h of air which passes through the catalyst to be regenerated laid in layer all along the furnace. It follows that the amount of propane used for heating the air is about 0.27 ton of propane/ton of catalyst in the first step and 0.53 ton/ton in the second step (weight expressed in relation with the regenerated catalyst).

also with a residence time of 12 minutes. The results are indicated in Table I. The remarks concerning test 3 are also applicable in test 4.

On the basis of the tests reported in Table I, it can be observed that the results obtained by the radiation system according to the invention are not only obtained at temperatures very substantially lower than those currently used in the prior art, but are obtained after a particularly short residence time, thus resulting in a substantial time saving.

TABLE I

|  | % S BY WEIGHT | % C BY WEIGHT | SPECIFIC SURFACE ($m^2/g$) | RESIDENCE TIME |
|---|---|---|---|---|
| Used catalyst | 6 | 12 | 220 | — |
| Test 1 | | | | |
| 1st step at 300° C. | 2.5 | 6 | — | .4 h |
| 2nd step at 500° C. | 0.4 | 0.25 | 230 | 4 h |
| Test 2 | | | | |
| 1st step at 230° C. | 1.5 | 3 | — | 4 h |
| 2nd step at 470° C. | 0.35 | 0.15 | 235 | 4 h |
| Test 3 | | | | |
| 1st step at 230° C. | 1.5 | 3 | — | 4 h |
| 2nd step | 0.35 | 0.10 | 240 | 12 mn |
| Test 4 | | | | |
| 1st step | 1.5 | 4 | — | 12 mn |
| 2nd step | 0.30 | 0.08 | 245 | 12 mn |

TEST 3 (conforming with the invention)

In a first step, the furnace shown in FIGS. 1 and 2 is used. The operation is conducted at 230° C. with a residence time of 4 hours.

About 1,000 kg per hour of catalyst have been treated with the use of 10 tons per hour of air (i.e. 10 t of air per ton of catalyst; generally, it is fruitful in the present application, to use for instance in the furnace of the revolving type, a weight of hot gas between 2.5 and 14 tons per ton of catalyst, these values being however not limitative.

The second step makes use of an infra-red radiation requiring a moderate power of 800 KW for 1 000 kg/h of catalyst to be treated, arranged as a layer of 20 mm thickness, with an air flow through the catalyst bed (40 $m^3$ of air/h/KW). The average temperature of the catalyst is maintained at only about 250° C., for a residence time of 12 minutes. The results are indicated in Table I.

The experiment shows that;
(1) When operating without an air flow through the catalyst bed a convenient catalyst layer should be about 10 mm thick and the residence time about 6 minutes,
(2) When it is desired to use the catalyst as a layer about 40 40 mm thick, the time exposure to radiation must be increased and the residence time must be about 22 minutes, while stirring the bed by means of air and extracting air below the grid of the conveyor.

TEST 4 (conforming to the invention)

A radiation furnace is used to effect each of the two catalyst regeneration steps.

In each of the two furnaces, the catalyst layer has a 20 mm thickness (power of 800 KW for 1000 kg/h of catalyst to be treated). The first step is effected with a residence time of 12 minutes, the second step being effected

What is claimed is:

1. A process for reactivating or regenerating solid catalyst particles used for the treatment or conversion of hydrocarbons, the process comprising at least one step of heating the catalyst particles wherein said heating step is conducted by (a) continuously displacing said catalyst particles through at least one elongate chamber having its longitudinal axis inclined with respect to a horizontal line at an angle of about 0°–5°, said particles progressing from an inlet zone of said chamber to an outlet zone of said chamber over a plurality of floor plates stepped so that the particles can fall from an upstream plate to a downstream plate as the particles are displaced, the plates being inclined at an angle with respect to the axis of the elongate chamber of less than 15°, said movement being imparted to the particles by causing the elongate chamber to vibrate in a direction substantially parallel to the elongate direction of the chamber, by means of vibratory power, at an amplitude such that a translational movement is imparted to said catalyst particles over the length of said chamber, with a substantially uniform statistical distribution over the length of said chamber, and with a variable speed producing continuous mixing of the individual particles with the catalyst particles remaining substantially in contact with the floor plates and being displaced substantially by sliding without microprojection on said floor plate, (b) heating said particles in said chamber along substantially the entire length of the chamber with infrared radiation having a wavelength in the range of about 0.75 µm–1.5 mm wherein said particles are irradiated over the entire surfaces thereof as they drop from upstream plates to downstream plates, and (c) establishing a gas flow into said chamber through the bed of catalyst particles by having said floor plate constructed of a discontinuous construction.

2. A two-step process of reactivation or regeneration of a catalyst containing hydrocarbon traces, sulfur and carbon, the first step comprising stripping the hydrocarbons and removing at least a portion of the sulfur, and the second step comprising removing at least a part of the carbon, and characterized in that at least the second step is conducted according to the process of claim 1.

3. A process according to claim 2, comprising the successive use of the same elongate chamber to effect each of the two steps.

4. A process according to claim 2, wherein the first step is effected in a revolving furnace comprising an elongate, substantially cylindrical and horizontal zone, slowly revolving on its longitudinal axis, and wherein the catalyst particles are stirred by means of at least one gas, at a temperature of 170°–350° C., the gas being introduced all along the chamber through openings provided in the walls of said chamber.

5. A process according to claim 2, wherein the first step is effected in a revolving furnace comprising an elongate, substantially cylindrical and horizontal zone, slowly revolving on its longitudinal axis and wherein the catalyst particles are stirred by means of at least one gas, at a temperature of 170°–245° C., the gas being introduced all along the chamber through openings provided in the walls of said chamber.

6. A process according to claim 1, conducted with the thickness of the catalyst particles layer comprising between 0.5 and 80 mm, and with a residence time of about 1–50 minutes.

7. A process according to claim 2 comprising the use of two separate elongate chambers for respectively effecting each of the two steps.

8. A process according to claim 2 wherein the first step is effected in a revolving furnace comprising an elongate substantially cylindrical and horizontal zone, slowly revolving on its longitudinal axis, and wherein the catalyst particles are stirred by means of at least one gas, at a temperature of 180°–290° C., the gas being introduced all along the chamber through openings provided in the walls of said chamber.

* * * * *